(12) United States Patent
Dunman

(10) Patent No.: US 7,232,306 B2
(45) Date of Patent: Jun. 19, 2007

(54) MODIFIED INJECTION TAKEOUT TUBE

(75) Inventor: James Dunman, Conowingo, MD (US)

(73) Assignee: Graham Packaging Company, LP, York, PA (US)

( * ) Notice: Subject to any disclaimer, the term of this patent is extended or adjusted under 35 U.S.C. 154(b) by 249 days.

(21) Appl. No.: 10/645,647

(22) Filed: Aug. 22, 2003

(65) Prior Publication Data

US 2005/0194709 A1    Sep. 8, 2005

(51) Int. Cl.
 *B29C 45/72* (2006.01)
 *B29C 49/64* (2006.01)
(52) U.S. Cl. .................. 425/548; 425/526; 425/556
(58) Field of Classification Search ............. 425/526, 425/547, 548
See application file for complete search history.

(56) References Cited

U.S. PATENT DOCUMENTS

| 4,382,905 | A | 5/1983 | Valyi |
| 5,176,871 | A | 1/1993 | Fukai |
| 5,232,715 | A | 8/1993 | Fukai |
| 6,223,541 | B1 | 5/2001 | Farrag |
| 6,488,878 | B1 * | 12/2002 | Neter et al. .................. 425/547 |
| 6,802,705 | B2 * | 10/2004 | Brand et al. ................. 425/547 |
| 6,951,453 | B2 * | 10/2005 | Neter et al. .................. 425/526 |
| 2003/0057598 | A1 | 3/2003 | Brand et al. | |

* cited by examiner

*Primary Examiner*—Robert B. Davis
(74) *Attorney, Agent, or Firm*—Venable LLP; James R. Burdett; Keith G. Haddaway

(57) ABSTRACT

A cooling device and method useful for reducing the total injection molding cycle time of an injection molded tube, and more particularly to applying cooling to areas of a preform that are not in direct contact with the water cooled inside surface of a take out tube.

11 Claims, 5 Drawing Sheets

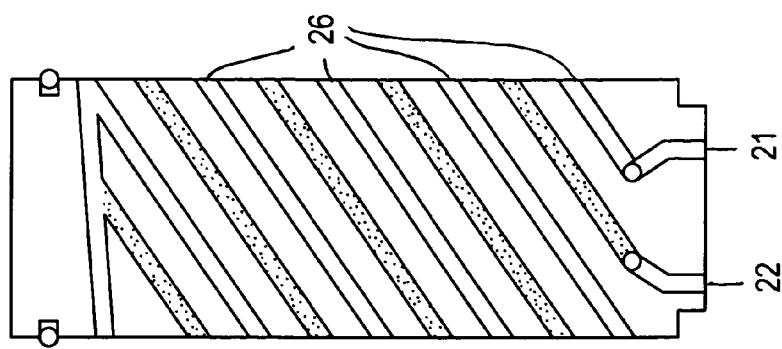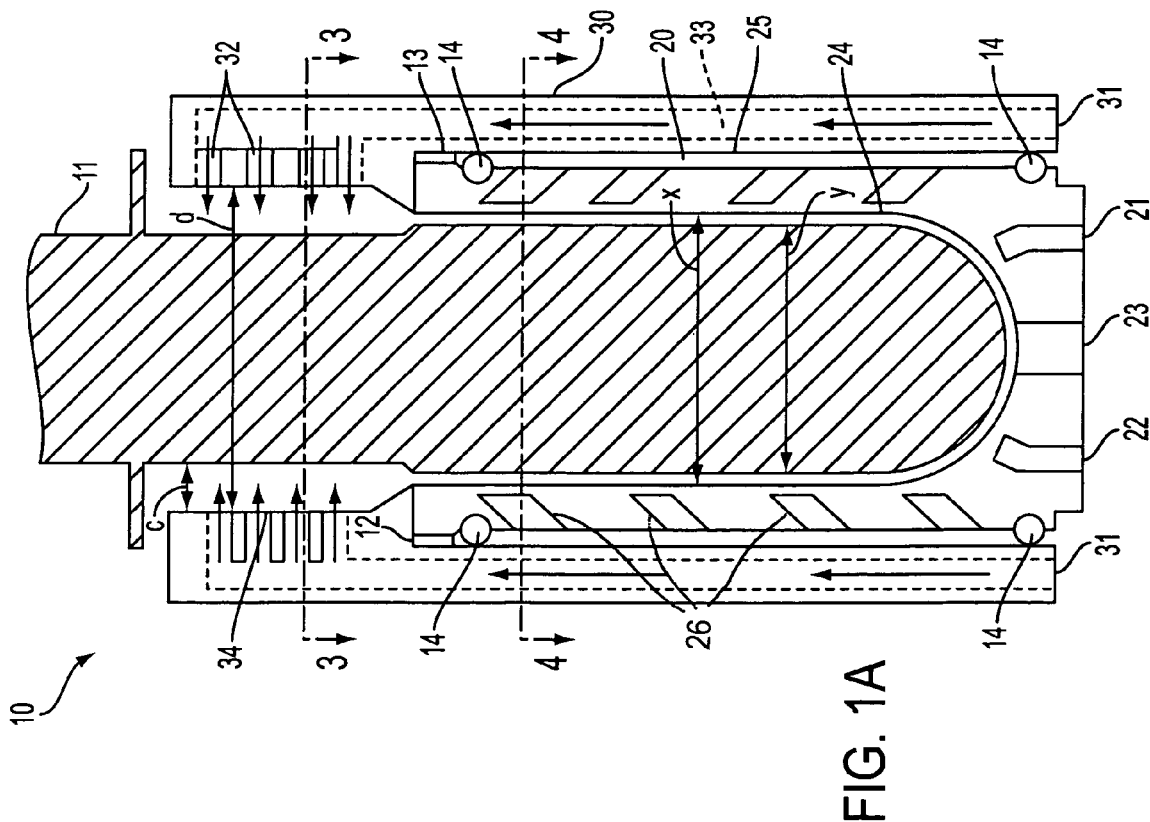
FIG. 1B
FIG. 1A

MODIFIED INJECTION TAKEOUT TUBE

BACKGROUND OF THE INVENTION

1. Field of the Invention

The present invention relates generally to a cooling device useful for reducing the total injection molding cycle time of an injection molded tube, and more particularly to applying cooling to areas of a preform that are not in direct contact with the water cooled inside surface of a take out tube.

2. Statement of the Prior Art

The manufacture of hot-fill polyethylene terephthalate (PET) containers employs an initial step of forming a parison or preform by an injection molding process. Performs are generally in the shape of a hollow cylinder closed at one end and tapering to form an open end, known as a finish, that can have a diameter that is narrower than the diameter of the closed end. Performs having an open end that is narrower than a closed end are known as reverse taper style performs. To form a reverse taper perform, molten plastic is injected into a mold formed by a cavity and a core and partially cooled before being ejected from the mold. Typically, the preform is only in the mold cavity long enough to form an inner skin and an outer skin. Once the preform is hard enough to be ejected from the mold, the preform is taken off of the core and ejected into a take out tube for additional cooling. Using a take out tube greatly reduces the injection molding cycle time because the preforms do not remain in the mold for an extended length of time.

Conventional take out tubes consist of a straight right cylinder having internal water cooling channels designed to cool the inside walls of the take out tube, and hence the outer surface of the preform that makes intimate contact with the inside walls of the take out tube. However, conventional take out tubes are not effective in cooling reverse taper style preforms because they fail to make intimate contact with the entire length of the preform. This failure to cool the entire length of the preform causes an increase in the molding injection cycle time because more time is required to cool those portions of the preform that do not make intimate contact with the inside walls of the take out tube. Thus what is needed is a take out tube that can cool the entire length of a reverse taper style preform.

Many attempts have been made in the past to improve post-mold cooling systems. However, these attempts have not resulted in a substantial reduction of the molding injection cycle time. For example, U.S. Pat. No. 4,382,905 to Valyi discloses a means for cooling a preform by cooling the walls of a mold that make contact with the preform. The problem with this approach is that the apparatus only cools the portion of the preform that makes direct contact with the cooled walls of the mold. Furthermore, this approach does not disclose cooling the preform outside the mold, which results in an increased injection molding cycle time. Additionally, U.S. Pat. Nos. 5,176,871 and 5,232,715 disclose cooling a preform by blowing air around the preform. The principle problem with the apparatus and method shown in these patents is that the preform is retained in the mold core and this retention significantly increases injection molding cycle time. Thus, a take out tube that cools the entire length of the perform, particularly a reverse taper perform represents a solution to a long standing problem in the art. Specifically, such a take out tube can reduce injection molding cycle time for reverse taper performs.

SUMMARY OF THE INVENTION

According to one embodiment of the present invention, a cooling apparatus is provided generally comprising a modified injection take out tube. The take out tube comprises a closed end, an open end, a fluid inlet, a fluid outlet, at least one fluid channel for circulating fluid from the fluid inlet to the fluid outlet, a first coupling on an outside surface of the take out tube, and a cooling sleeve. The cooling sleeve comprises an inlet, a plurality of holes, at least one channel fluidly connecting the inlet to the plurality of holes, and a second coupling on an inside surface of the cooling sleeve. The first and second couplings cooperate to couple the take out tube to the cooling sleeve, and the plurality of holes are positioned beyond the open end of the take out tube when the take out tube and the cooling sleeve are coupled.

According to another embodiment of the present invention, a method for cooling a preform is disclosed. A preform is first provided then located within a cavity of a cooling apparatus. A cooled fluid is then introduced into a take out tube of the cooling apparatus, allowing heat transfer between an inner surface of the take out tube and a portion of the preform that makes intimate contact with the inner surface. Then, a gas is introduced into a cooling sleeve of the cooling apparatus, allowing heat transfer between the cooled fluid and the gas. Finally, the gas is blown out of the at least one hole in the cooling sleeve onto the preform.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

FIG. 1A depicts a vertical cross-sectional view of an exemplary embodiment of a cooling apparatus according to the present invention;

FIG. 1B depicts a vertical cross-sectional view of the cooling apparatus shown in FIG. 1A, without the preform, in order to further illustrate the fluid channels contained therein;

DETAILED DESCRIPTION OF AN EXEMPLARY EMBODIMENT OF THE PRESENT INVENTION

Figure 2:
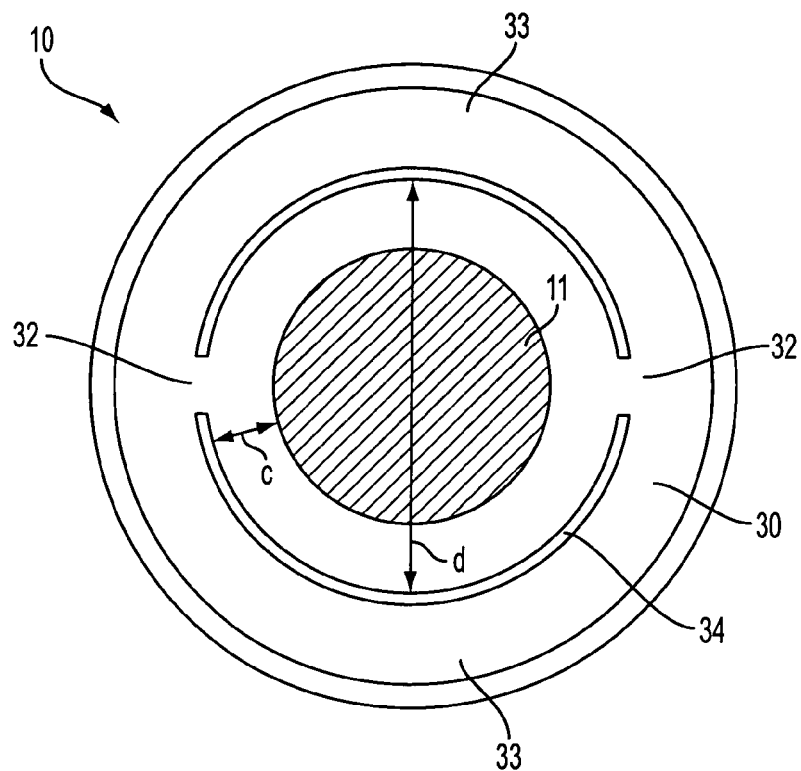
FIG. 2 depicts a horizontal cross-sectional view of an exemplary embodiment of a cooling apparatus according to the present invention.

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

FIGS. 1A and 1B show a vertical cross-sectional view of a cooling apparatus 10 for use with an injection-molding machine (not shown). The injection-molding machine can include a 20–180 PSI air system (not shown) for use in conjunction with the present invention. Cooling apparatus 10 can include take out tube 20 and cooling sleeve 30, which can be used to cool reverse taper style preform 11 or the like. For a more detailed description of a reverse taper style preform, please refer to the discussion of FIG. 6 below.

Take out tube 20 can include fluid inlet 21, fluid outlet 22, air passage 23, inner surface 24, and outer surface 25. Fluid inlet 21 and fluid outlet 22 are fluidly connected through channels 26 throughout cooling sleeve 20. A fluid entering fluid inlet 21 travels through the fluid channels 26 and out through fluid outlet 22, thus cooling the take out tube 20. Additionally, as illustrated in FIGS. 1A and 1B, take out tube 20 can have an open end and a closed end. The inner surface 24 can have a diameter x that is slightly larger than the diameter y of preform 11. Cooling sleeve 30 can include gas inlet 31, gas exiting holes 32, gas channel 33, and upper inner surface 34. Upper inner surface 34 of cooling sleeve 30 can have a diameter d, which is slightly lager than the diameter x of inner surface 24 of take out tube 20. For example, diameter d of inner surface 34 can be $3/16$ of an inch or any other distance larger than the inner surface 24 of take out tube 20 that will allow the gas exiting holes 32 to circulate a cool gas around perform 11. To compensate for the difference in diameter, inner surface 34 of cooling sleeve 30 can have an angled or curved portion extending from an open end of take out tube 20.

In an exemplary embodiment, air channel 33 can encompass the entire diameter of cooling sleeve 30 as shown in FIGS. 1–4. In this embodiment, holes 32 can be placed anywhere along inner surface 34 of cooling sleeve 30 that does not make intimate contact with preform 11. The number of holes 32 place on the inner surface can depend on the size and/or shape of preform 11. For example, if preform 11 has a long tapered portion 14, any number of holes 32 can be stacked vertically, and any number of stacks can be placed along the diameter of the inner surface 34 of cooling sleeve 30. If preform 11 has a short tapered portion, a number of single holes can form a ring around the diameter of inner surface 34 of cooling sleeve 30.

Figure 5:
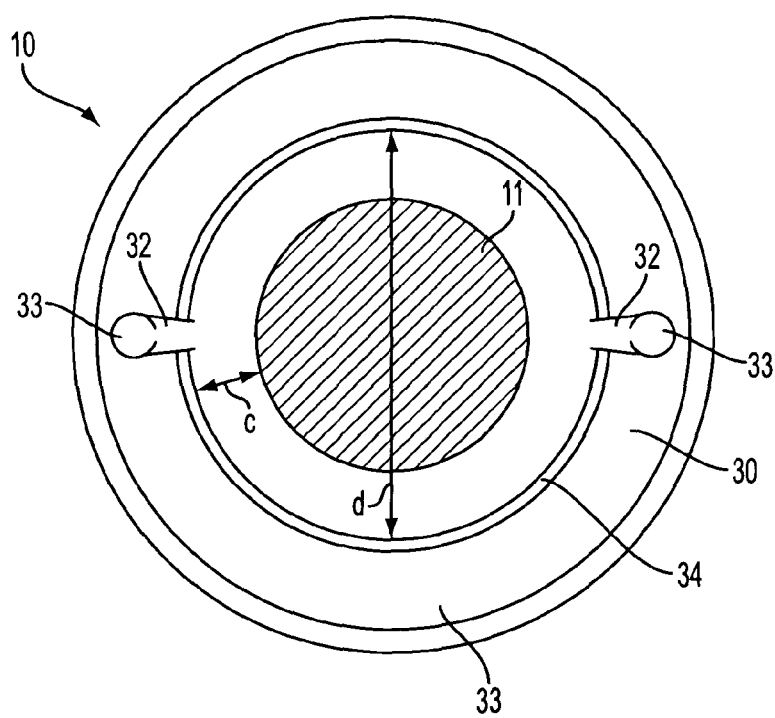
FIG. 5 depicts a horizontal cross-sectional view of an exemplary embodiment of a cooling apparatus according to the present invention.

In another exemplary embodiment, air channel 33 can be a distinct number of channels spaced apart from each other inside cooling sleeve 30. For example, in FIG. 5, cooling sleeve 30 has two gas channels 33 that are formed by distinct channels spaced equally apart. Each gas channel 33 can end with any number of holes 32 to allow a cooled gas to exit cooling sleeve 30 and circulate around preform 11.

Cooling apparatus 10 can be formed by coupling cooling sleeve 30 to take out tube 20 at coupling point 12. Although FIG. 1A illustrates coupling point 12 to be substantially at the open end of take out tube 20, it is to be understood by a person of ordinary skill in the art that take out tube 20 and cooling sleeve 30 can be coupled at any point where the two devices make contact. Coupling the cooling sleeve to the take out tube in this manner causes the take out tube 20 to be inserted inside cooling sleeve 30. To secure the coupling at coupling point 12, connection means, for example, threads 13, can be used to screw cooling sleeve 30 onto take out tube 20. Additionally, other coupling means such as, e.g., a push and twist device or a friction fit mechanism can be used to couple take out tube 20 and cooling sleeve 30. For example, an over center lock can be used. Such over center lock means typically incorporate a pin and a groove within which the pin is adapted to fit. As the device is turned, the pin follows the groove until it reaches a locked position (e.g., a detent) within the groove. To seal take out tube 20 and cooling sleeve 30, "O"-ring seals 14 can be used. "O"-ring seals 14, can seal the outer surface 25 of take out tube 20 to prevent liquid from leaking out of take out tube 20 and onto preform 11.

FIG. 2 depicts a horizontal cross-sectional view of a first exemplary embodiment of a portion of a cooling sleeve 30 that is set outside of take out tube 20. Cooling sleeve 30 can have an air channel 33 that encompasses the entire diameter of cooling sleeve 30 and fluidly connects gas inlet 31 with gas exiting holes 32. In FIG. 2, cooling sleeve 30 has two holes 32 equally spaced apart so that they are opposite from each other. It can be understood by a person of ordinary skill in the art that the cross-sectional view only shows one set of holes 32 opposite each other, but any number of holes 32 can be vertically stacked in the same position extending along inner surface 34 of cooling sleeve 30, as shown in FIG. 1A. Distance c represents the distance between the inner surface 34 of cooling sleeve 30 and preform 30. In an exemplary embodiment of the present invention, the distance c can be about $3/16$ of an inch, or any other distance that allows the gas exiting holes 32 to circulate around preform 11.

Figure 3:
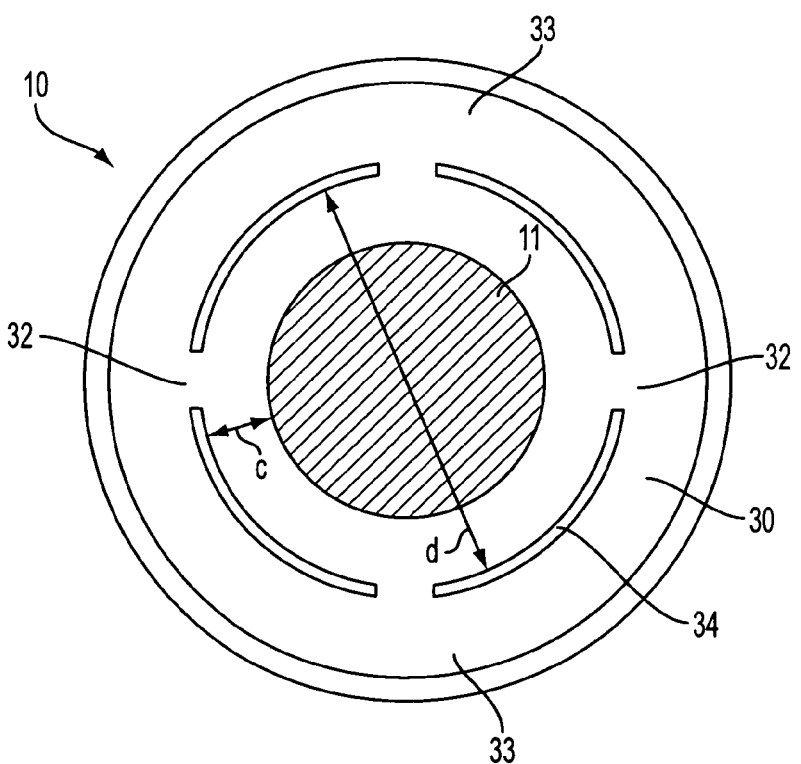
FIG. 3 depicts a horizontal cross-sectional view of an exemplary embodiment of a cooling apparatus according to the present invention.

FIG. 3 depicts a horizontal cross-sectional view of a second exemplary embodiment of a portion of a cooling sleeve 30 that is set outside of take out tube 20. Cooling sleeve 30 can have an air channel 33 that encompasses the entire diameter of cooling sleeve 30 and fluidly connects inlet 31 with holes 32. In FIG. 3, cooling sleeve 30 has four holes 32 equally spaced apart so that there are two sets of holes 32 opposite from each other. It can be understood by a person of ordinary skill in the art that the cross-sectional view only shows one set of holes 32, but any number of holes 32 can be vertically stacked in the same position extending along inner surface 34 of cooling sleeve 30, as shown in FIG. 1A. Distance c represents the distance between the inner surface 34 of cooling sleeve 30 and preform 30. In an exemplary embodiment of the present invention, the distance c can be $3/16$ of an inch, or any other distance that allows the gas exiting holes 32 to circulate around preform 11. Additionally, it can be understood by a person of ordinary skill in the art that cooling sleeve 30 can have any number of holes 32 that are necessary to cool preform 11 to the desired temperature and that the two embodiments described above in no way limit the number of holes 32 used in accordance with the present invention.

Figure 4:
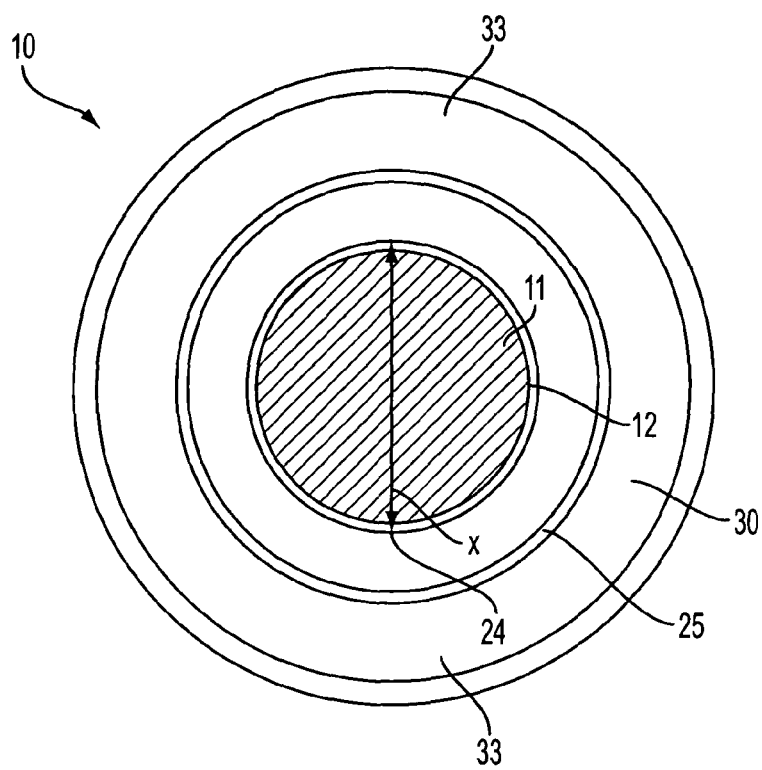
FIG. 4 depicts a horizontal cross-sectional view of an exemplary embodiment of a cooling apparatus according to the present invention.

FIG. 4 depicts a horizontal cross-sectional view of an exemplary embodiment of cooling apparatus 10. Cooling apparatus 10 can include take out tube 20 and cooling sleeve 30. In FIG. 4, take out tube 20 is coupled to cooling sleeve 30 in a manner that causes take out tube 20 to be inserted inside cooling sleeve 30. Take out tube 20 can have inner surface 24 and outer surface 25. When preform 11 is inserted into cooling apparatus 10, outer surface 12 of preform 11 can make intimate contact with the entire diameter x of inner surface 24 of take out tube 20.

Figure 6:
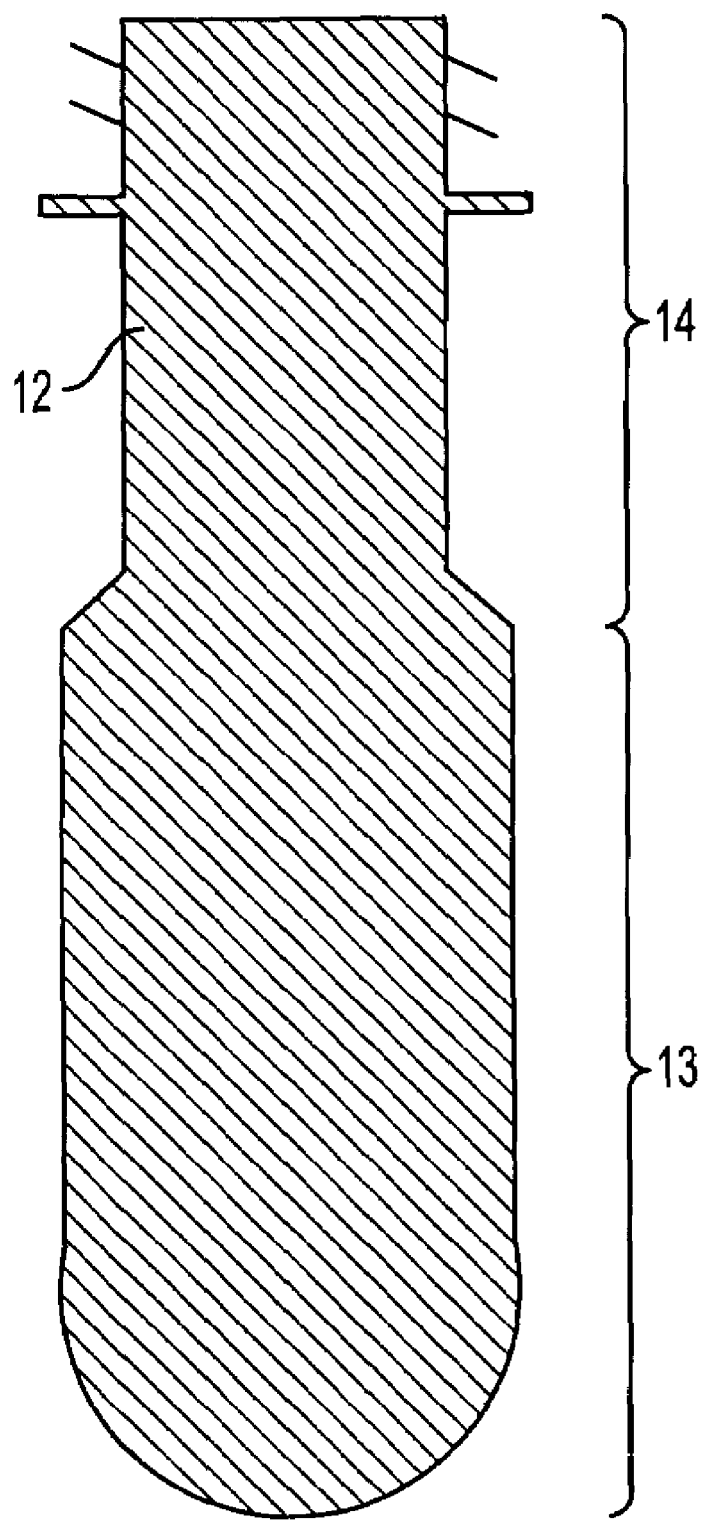
FIG. 6 depicts an exemplary embodiment of a reverse taper style preform according to the present invention.

FIG. 6 depicts an exemplary embodiment of a preform that can be used in accordance with the present invention. Preform 11, can be know as a reverse taper style preform. Reverse taper style performs can be in the shape of a hollow cylinder closed at one end and tapering to form an open end, known as a finish, that has a diameter that is narrower than the diameter of the closed end. Preform 11 can have an outer surface 12, a lower portion 13, and a tapered portion 14. The lower portion 13 can begin at the closed end and can taper to form tapered portion 14 at the open end of preform 11.

Figure 7:
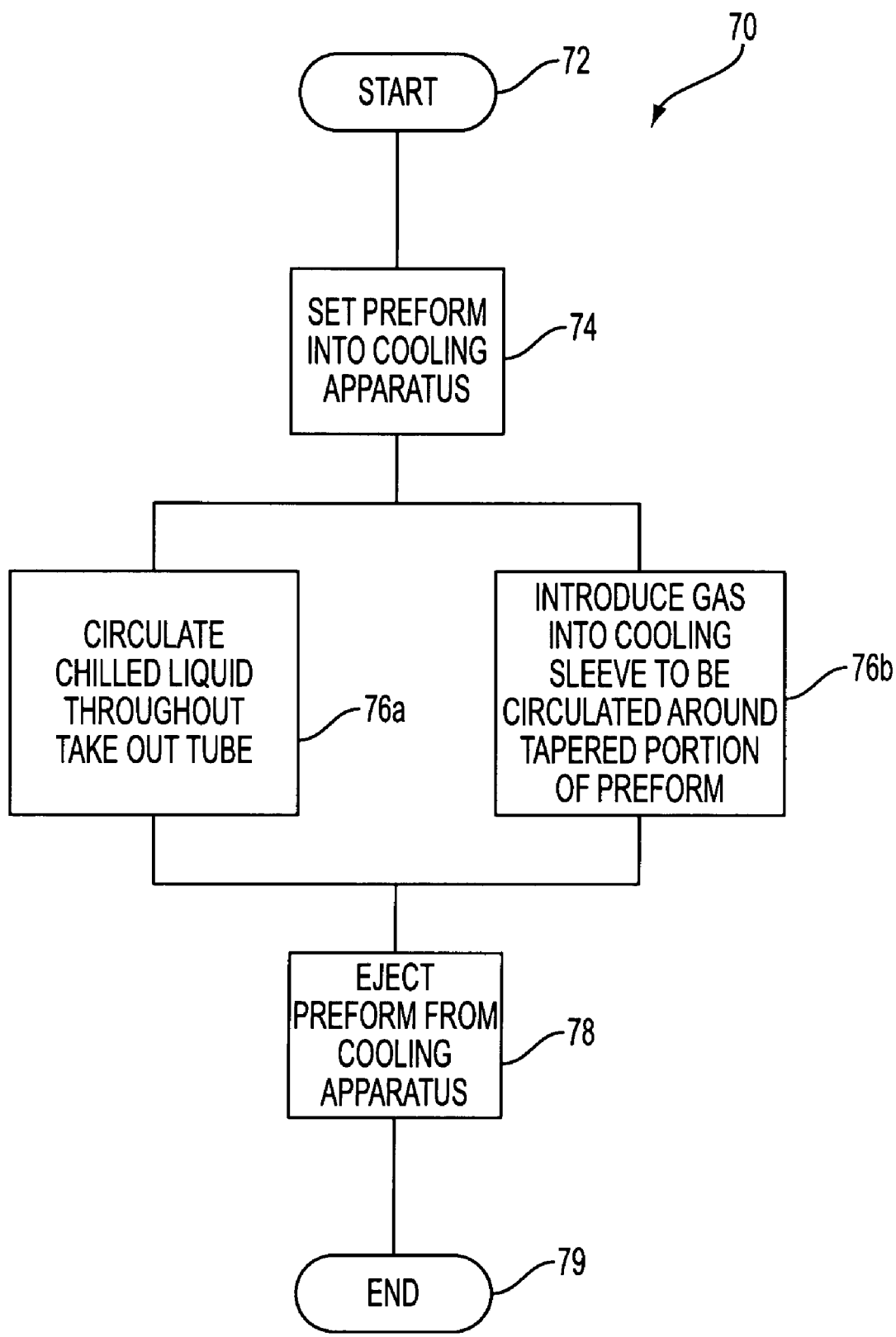
FIG. 7 depicts a flow diagram illustrating an exemplary embodiment of a process for cooling a preform in accordance with the present invention.

The exemplary embodiment of this invention, as described above, can be used in the injection molding process after the initial step of forming the preform. FIG. 7 depicts a flow diagram illustrating an exemplary embodiment of a process for cooling preform 11 in accordance with the present invention. Flow diagram 70 can begin with step 72 and can proceed immediately to step 74. In step 74, preform 11 can be set into cooling apparatus 10. For example, a preform 11 can be ejected from an injection mold (not shown), and received by cooling sleeve 20. Alternatively, the injection molding process may occur inside the take out tube by ejecting molten plastic through a core (not shown), and into the take out tube. Such methods utilize techniques well known in the injection molding art. When a preform 11 enters cooling apparatus 10, a vacuum can be applied to preform 11 through air passage 23 to hold preform 11 in place.

Once the preform 11 is in place, the outer surface 12 of the lower portion 13 of preform 11 makes intimate contact with the inner surface 24 of cooling sleeve 20. In contrast, the outer surface 12 of the tapered portion 14 of preform 11 does not make intimate contact with the inner surface 34 of cooling sleeve 30. From step 74, flow diagram 70 can proceed to steps 76a and 76b.

In step 76a, a chilled fluid can be circulated throughout take out tube 20 to begin the cooling process. The fluid may be any liquid or a gas capable of being circulated through the take out tube. A chilled fluid, such as, e.g., water, can enter the take out tube via fluid inlet 21. The chilled fluid circulates through channels in the take out tube and exits through liquid outlet 22. Accordingly, the inner surface 24 of take out tube 20 begins to cool. Contemporaneously, a heat transfer occurs between the outer surface 12 of preform 11, causing the lower portion 13 of preform 11, i.e., the portion of preform 11 that makes intimate contact with inner surface 24 of take out tube 20, to cool. As the chilled fluid circulates throughout take out tube 20, some of that fluid can exit take out tube via fluid outlet 22.

Step 76b can occur contemporaneously with step 76a. In step 76b, a gas, such as, e.g., air, or some other super cooled gas, such as, e.g., nitrogen gas can be injected into gas inlets 31. In one embodiment of the invention, gas, typically under low pressure, can travel through air channels 33 and exit cooling sleeve 30 via gas exiting holes 32. The distance c between the outer surface 12 of the tapered portion 14 of preform 11 and the inner surface 34 of cooling sleeve 30 allows the gas to exit holes 32 and be applied to the outer surface 12 of tapered portion 14 of preform 11 and circulate around the outer surface 12 of the tapered portion 14 of preform 11, causing it to cool for example by heat transfer from the cooled liquid circulating in the take out tube to the gas circulating through cooling sleeve 30. From steps 76a and 76b, flow diagram 70 can proceed to step 78.

In step 78, after cooling to the desired temperature, preform 11 can be ejected from cooling apparatus 10. Preform 11 may be ejected from cooling apparatus 10 by, for example, applying air pressure into cooling apparatus 10 via air passage 23 to blow preform out of cooling sleeve 10. Flow diagram can then end with step 79.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A cooling apparatus comprising:
   a take out tube, said take out tube comprising:
      a closed end;
      an open end;
      a fluid inlet;
      a fluid outlet;
      at least one fluid channel for circulating fluid from said fluid inlet to said fluid outlet;
      a first coupling on an outside surface of said take out tube; and a cooling sleeve, said cooling sleeve comprising:
      an inlet;
      a plurality of holes;
      at least one channel fluidly connecting said inlet to said plurality of holes; and
      a second coupling on an inside surface of said cooling sleeve;
   said first and second couplings cooperating to couple said take out tube to said cooling sleeve; and
   said plurality of holes positioned beyond said open end of said take out tube when said take out tube and said cooling sleeve are coupled.

2. The cooling apparatus according to claim 1, said take out tube positioned inside said cooling sleeve when coupled.

3. The cooling apparatus according to claim 2, further comprising a seal operative to seal an area between said take out tube and said cooling sleeve.

4. The cooling apparatus according to claim 2, wherein said first coupling and said second coupling are interlockable threads.

5. The cooling apparatus according to claim 2, wherein said first coupling and said second coupling comprise an over center lock.

6. The cooling apparatus according to claim 2, wherein said first coupling and said second coupling are a quick coupling.

7. The cooling apparatus according to claim 2, wherein said first coupling and said second coupling are friction fit.

8. The cooling apparatus according to claim 1, wherein said at least one channel encompasses the entire diameter of said cooling sleeve.

9. The cooling apparatus according to claim 1, wherein said at least one channel comprises a plurality of distinct channels fluidly connecting a plurality of inlets to a plurality of holes.

10. The cooling apparatus according to claim 1, said take out tube further comprising an air passage, said air passage being operative to seat and eject a preform.

11. The cooling apparatus according to claim 1 wherein paid plurality of holes are positioned on an inside surface of said cooling sleeve and wherein said inside surface of said cooling sleeve has a diameter that is larger that the diameter of an inside surface of said take out tube.

* * * * *